United States Patent [19]

Sasaki et al.

[11] Patent Number: 4,992,129

[45] Date of Patent: Feb. 12, 1991

[54] TRANSFER PRINTING METHOD

[75] Inventors: Hitoshi Sasaki; Shoji Igota, both of Kawasaki, Japan

[73] Assignee: Ajinomoto Co., Inc., Tokyo, Japan

[21] Appl. No.: 144,647

[22] Filed: Jan. 11, 1988

Related U.S. Application Data

[63] Continuation of Ser. No. 798,317, Nov. 15, 1985, abandoned.

[30] Foreign Application Priority Data

Nov. 15, 1984 [JP] Japan ............ 59-239449
Nov. 15, 1984 [JP] Japan ............ 59-239450

[51] Int. Cl.[5] ............ B32B 1/00

[52] U.S. Cl. ............ 156/240; 156/241; 156/249; 156/289

[58] Field of Search ............ 156/230, 240, 249, 234, 156/284, 241, 289; 400/120; 101/34, 39; 427/171

[56] References Cited

U.S. PATENT DOCUMENTS

| | | | |
|---|---|---|---|
| 3,922,435 | 11/1975 | Asnes | 18/240 |
| 3,987,225 | 10/1976 | Reed et al. | 427/147 |
| 4,027,345 | 6/1977 | Fujisawa et al. | 156/240 |
| 4,107,365 | 8/1978 | Reed et al. | 427/148 |
| 4,123,309 | 10/1978 | Perrington et al. | 156/234 |
| 4,322,467 | 3/1982 | Heimbach et al. | 156/240 |
| 4,329,779 | 5/1982 | England | 156/241 |
| 4,379,017 | 4/1983 | Barta | 156/249 |
| 4,382,831 | 5/1983 | Clough et al. | 156/249 |
| 4,391,853 | 7/1983 | Pointon | 156/234 |
| 4,477,303 | 10/1984 | Ohe et al. | 156/230 |
| 4,541,042 | 9/1985 | Kohashi | 400/120 |
| 4,545,838 | 10/1985 | Minkus | 156/230 |
| 4,548,857 | 10/1985 | Galante | 156/240 |
| 4,581,266 | 4/1986 | Magnotta | 156/240 |
| 4,651,167 | 3/1987 | Moriguchi et al. | 400/120 |
| 4,819,010 | 4/1989 | Kohashi et al. | 400/120 |
| 4,875,963 | 10/1989 | Paschke | 427/171 |

OTHER PUBLICATIONS

Concise Chemical and Technical Dictionary, Chemical Publ. Co., N.Y., N.Y., 1962, p. 204 definitions.

*Primary Examiner*—Michael W. Ball
*Assistant Examiner*—Louis Falasco
*Attorney, Agent, or Firm*—Oblon, Spivak, McClelland, Maier & Neustadt

[57] ABSTRACT

A method for thermal transfer printing by heating a transfer sheet having a printing ink layer formed on a base sheet with a hot roll, wherein the base sheet comprises biaxially stretched plastic film, and, at the same time, pressing with the hot roll the transfer sheet against a substrate for printing, thereby transferring the printing ink layer to the substrate, wherein the substrate for printing is preheated prior to the pressing, and a transfer printing machine having a supplying roll axle for a roll of transfer paper urged to rotate in the rewinding direction by an urging force, a heat roll for performing heat transfer by pressing one surface of the transfer paper on which printing ink is not applied so as to cause the transfer paper to pressingly contact an object of transfer with a surface to which printing ink has been applied, and a takeup roll axle adapted for intermittently rotating and rewinding, for each rotation thereof, one pitch of the transfer paper having undergone the transfer, an improvement which comprises a pullback mechanism for partially pulling back, by utilizing the urging force, each pitch of transfer paper having been fed in one period of the transfer cycle before the next transfer cycle is started, are disclosed.

5 Claims, 5 Drawing Sheets

TRANSFER PRINTING METHOD

This application is a continuation of application Ser. No. 798,317, filed on Nov. 15, 1985, now abandoned.

BACKGROUND OF THE INVENTION

1. Field of the Invention

This invention relates to improvements in a method for printing patterns or letters on substrates for printing (such as plastic containers) by thermal transfer of prints and to an apparatus useful in thermal transfer printing.

2. Discussion of the Background

Various methods have been used for printing on curved surfaces of various plastic containers used for cosmetic articles and foodstuffs, such as the offset method, the silk screen method, and the thermal transfer method.

Various disadvantages exist for each of these methods. The offset method has the disadvantage that since it operates by having different colors placed one after another on a rubber plate, the number of colors is limited and so-called process picture patterns using continuously changing colors cannot be printed. The silk screen method has the disadvantage that it suffers from a low printing speed in addition to its inability to print process picture patterns.

The thermal transfer method comprises printing a picture pattern in advance on a transfer sheet by gravure printing and transferring the printed picture pattern through the agency of heat. Therefore, it is capable of producing clean prints. It nevertheless has a disadvantage in that the printing speed is low because (1) the transfer relies for heat and pressure on the hot roll and (2) the transfer sheet is expensive because the base sheet is high quality paper. The transfer sheet conventionally used in the prior art for the thermal transfer method, as illustrated in FIG. 10, comprises a base sheet 21 made of quality paper, strips of a printing ink layer 3 formed as regularly spaced on the base sheet 21 through the medium of a peel layer 103, and an adhesive layer 105 applied on the printing ink layer 3. A frontal view of a transfer paper is shown (for example) in FIG. 3, which shows a transfer layout sheet 1 of continuous length made of a base sheet 21 on which printing ink surfaces 3*a*, 3*b*, 3*c*, etc. are coated at equal intervals, leaving a blank space 3 between each. By heating the transfer sheet with a hot roller kept at (for example) 220° C. and, at the same time, pressing it against a given substrate for printing with the hot roller, the printing ink layer 4 is transferred in conjunction with the aforementioned adhesive layer 105 to the substrate.

Various apparatuses have been known for use in thermal transfer printing. A modified version of the machine shown in FIG. 1 has been known in which a sensor 13 is provided in the position indicated by the dotted line. In this figure, numeral 5 denotes the supplying roll axle around which the transfer paper 1 is wound, and numeral 6 denotes the takeup roll axle for taking up transfer paper 1*a* used in transferring, which is intermittently driven and rotated. An encouraging means (not shown) for rotating the supplying roll axle 5 reversely in relation to the direction in which the transfer paper 1 is pulled out is attached to the supplying roll axle 5. A clutch plate rotating the supplying roll axle 5 in the reverse direction by virtue of frictional force may, for example, be used as this encouraging means. This clutch plate encourages the supplying roll axle 5, being in contact therewith, to rotate constantly in the reverse direction in relation to the pull-out direction. This encouraging force is adjusted to be smaller than the pull-out force for the transfer paper 1 caused by rotational force of the takeup roll axle 6 and a heat roll 7. While the takeup roll axle 6 and the heat roll 7 are working, the clutch plate and the supplying roll axle 5 slip therebetween so that the supplying roll axle 5 rotates in the pull-out direction of the transfer paper 1.

The heat roll 7 for the heat transfer is usually installed to be movable upwards and downwards and is driven to constantly rotate in the counterclockwise direction, and, when moved downwards, presses the transfer paper 1 against an object of transfer 8 to perform transference by virtue of its heat. The heat roll 7 is heated to approximately 200 degrees by a heating means such as an infrared heater, which is not shown in the drawings. The objects of transfer 8 are successively fed from a feeding path 9 and successively or intermittently moved beneath the heat roll 7, one after another, by being loosely inserted on mandrels which are rotatably provided in rotating plates 10 which rotates in a clockwise direction. After the heat transfer is finished, the object of transfer 8 is transferred through a feeding-out path 12 to a next step. The sensor 13, using a photoelectric tube, senses the ends of the printing ink surfaces 3*a*, 3*b*, etc. and commands the rotation of the takeup roll axle to stop. The sensor 13 has been placed above the moving path of the transfer paper 1 immediately below the heat roll 7 where the center of the blank space 4 is to be stopped. The heat transfer is performed by such a machine described in the following manner. That is, the roll of the transfer paper 1 is set on the supplying roll axle 5 and hung therefrom over the takeup roll 6, as indicated by a solid line in FIG. 1. Next, the takeup roll axle 6 is rotated and stopped in a position where the leading tip of the initial printing ink surface 3*a* closely approaches the position immediately below the heat roll 7. This position is identified by using the sensor 13. The heat roll descends and feeds out the transfer paper 1 towards the takeup roll, performing heat transfer onto the object of transfer 8. The transfer paper 1*a* which has undergone the transfer process gradually hangs down as indicated by a dotted line in FIG. 1. In the latter half period of the heat transfer process, the takeup roll 6 begins to rotate and wind up a part of the suspended transfer paper 1*a*. After the heat transfer is finished, the heat roll 7 moves upwards and winds up an amount of the transfer paper 1*a* corresponding to one pitch. The rotation of the takeup roll axle 6 stops when the sensor 13 has sensed the end of the printing ink surface.

The blank spaces 4 formed between the printing ink surfaces 3*a*, 3*b*, etc. of the transfer paper are provided for the purpose of avoiding deformation of figures and patterns on the transfer paper due to any stretching thereof near the heat roll which might be caused by the heat. This blank space of the conventional art has a length of as much as 30 to 50 mm. Accordingly, there has been a problem in that the transfer layout sheet is greatly elongated and its cost is thus high.

SUMMARY OF THE INVENTION

Accordingly, it is an object of this invention to provide a method of thermal transfer printing that provides improved conduction of heat from the hot roll to the printing ink layer and which enables rapid printing of clear prints.

It is a further object of this invention to provide for reduced expense of thermal transfer printing by providing an apparatus that will allow the use of transfer paper having smaller than usual blank spaces between the patterns to be printed.

These and other objects of the invention have been accomplished by providing a method for thermal transfer printing which comprises heating a transfer sheet having a printing ink layer formed on a base sheet with a hot roller, wherein said base sheet is a biaxially stretched plastic film, and concurrently pressing said transfer sheet against a substrate for printing with the same hot roller, thereby transferring said printing ink layer onto said substrate, wherein said substrate is preheated prior to said pressing. The invention also comprises an improvement in a transfer printing machine having a supplying roll axle for a roll of transfer paper urged to rotate in the rewinding direction; a heat roller for performing heat transfer by pressing one surface of the transfer paper on which printing ink is not applied so as to cause the transfer paper to pressingly contact the object of transfer; and a takeup roll axle adapted for intermittently rotating and taking up, for each rotation thereof, one pitch of the transfer paper having undergone said transfer, said improvement being characterized by comprising a pull back mechanism for partially pulling back, by utilizing an urging force, each said pitch of transfer paper having been fed in each period of the transfer cycle before the next transfer cycle is started. Both the method and apparatus provide for reduced expense of thermal transfer printing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
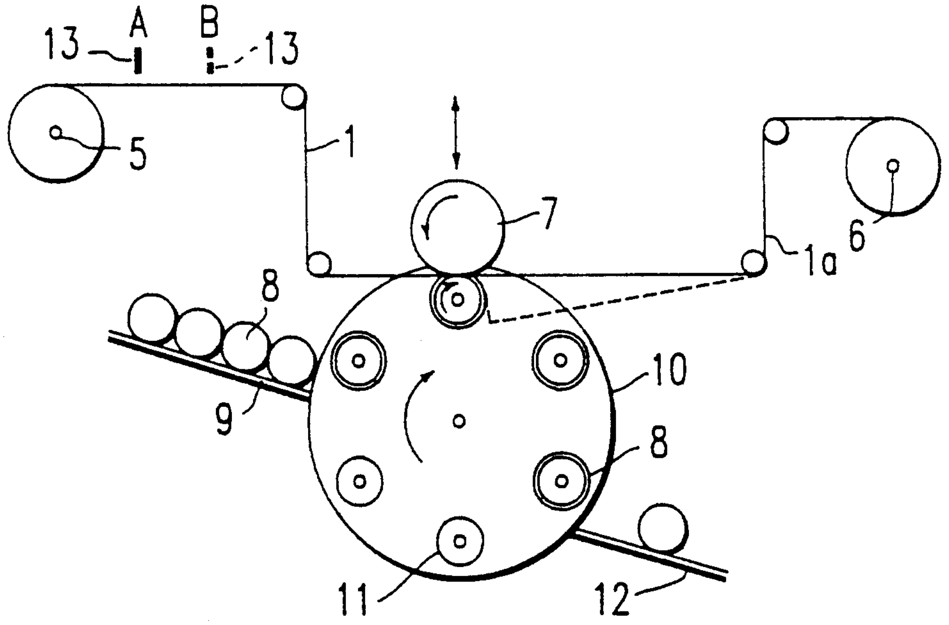
FIG. 1 is a front view of one embodiment according to the present invention.

This invention has been produced for the purpose of solving the drawbacks suffered by the conventional methods as described above. One aspect of the invention is characterized by using a biaxially stretched plastic film as the base sheet and, at the same time, effecting the thermal transfer after the substrate for printing has been preheated. To be specific, this aspect of the invention is directed to a method for transfer printing by heating a transfer sheet having a printing ink layer formed on a base sheet with a hot roller and, at the same time, pressing the transfer sheet against a substrate for printing with the hot roller thereby transferring the printing ink layer to the substrate, which method is characterized by using biaxially stretched plastic film as the base sheet and, at the same time, effecting the transfer after the substrate for printing has been preheated.

The transfer sheet has strips of printing ink layer superposed as regularly spaced on a base sheet. Generally, a peel layer is formed on the base sheet by first applying a peeling agent and, when necessary, superposing a top coat thereon. The peeling agent so used is either of an acrylic type or of a chloride-rubber type. The top coat may be formed, for example, by using the peeling agent as described above. On the printing ink layer, generally an adhesive layer intended to provide required adhesion on the curved surface of a given container is superposed. Of course, the material for the adhesive layer is selected to suit both the material forming the printing ink surface and that forming the outer surface of the container.

The method of this invention is characterized by using a film of biaxially stretched plastic as the base sheet for the transfer sheet of the foregoing description. Although the thickness of the base sheet is variable with the temperature of the hot roll, the preheating temperature of the container, the length of transfer time, etc., it is important that this thickness should at least exceed the minimum required for withstanding the heat used during the course of transfer. In most cases, the proper thickness falls in the range of 10 to 50 μm. As regards the plastic film, an unstretched film is unsuitable because the film has the possibility of stretching out and deforming the printed ink surface. A monoaxially stretched film is also unsuitable because this film has the possibility of sustaining fracture.

The kinds of containers subjected to printing by the method of this invention are not specifically restricted. Typical examples of such containers are various containers having layers of polyethylene, polypropylene, polyethylene terephthalate, vinyl chloride, polycarbonate, and acryl resin on the outermost surfaces thereof; plastic handles, as for writing utensils; and cans of iron, aluminum, and other metals. These containers are used for holding beverages, foodstuffs, cosmetic articles, medicines, and the like.

The temperature of the hot roller is required not to exceed 240° C. and is particularly desired to fall below 230° C. Although this temperature is variable with the materials for the adhesive layer, the peel layer, and the printing ink layer, it is desired to exceed 170° C. where the container is used for holding a foodstuff and, therefore, is destined to be heated, for example, in a retort.

The preheating temperature is desired to be as high as possible within the range in which the temperature has no adverse effect on the container. In the case of a container made predominantly of polypropylene, the preheating temperature is proper in the range of 90° to 130° C. The type of preheating means is irrelevant. An electric heater, an infrared ray heater, or a flow of hot air can be utulized effectively. For the purpose of enabling the container to be uniformly preheated, this preheating is desirably carried out within a space enclosed by a box, for example.

In the method of this invention, the adoption of the biaxially stretched plastic film as a base sheet in the place of quality paper improves the conduction of heat from the hot roll to the printing ink layer, and the preheating of the substrate for printing enables the thermal transfer printing to proceed rapidly and produce a clear print.

The present invention also provides an apparatus capable of reducing blank space on the transfer sheet. An apparatus is arranged such that a means for pulling back the transfer paper which has undergone the transfer process by the heat roll is disposed on the moving path of the transfer paper. This pullback means may be a kind which uses a sensor such as a photoelectric tube for detecting a particular position of the transfer paper or a kind which uses a movable bar for tensioning the transfer paper.

In the case of using a sensor, its position may be shifted toward the supplying roll by the extent of the pullback from the position it assumes in the conventional position arrangement. It is easily understood that there is an appropriate position for the sensor in this way which corresponds to each pitch of the transfer paper 1 on the moving path of the transfer paper 1 and 1*a*. If the position is to be detected on the side of the transfer paper 1*a*, a suitable mark for detection by the sensor can be previously marked on the transfer layout sheet. The pullback distance is limited to a range sufficient to reduce the influence of the heat of the heat roll on the leading tip of the printing ink surface to next undergo the transfer. The distance may usually be limited to a point corresponding to the center of the blank space 4 on the conventional transfer paper. If a longer pullback distance is assumed, it is necessary for the heat roll 7 to rotatively and pressingly contact the object of transfer 8 for a correspondingly longer period.

In the case of using a movable bar, the movable bar is provided on the moving path of the transfer paper 1*a*, and the transfer paper la is suspended on the movable bar, so that the moving path is elongated to the extent of the loop formed by the suspended length of the paper. After the driven rotation of the rewinding roll axle 6 is finished, and the work of the sensor 13 ceases, the movable bar moves and shortens the length of the moving path so that the transfer paper retreats by a corresponding amount. The pullback distance and the period of the rotative, pressing contact of the heat roll are similar to the above.

Figure 3:
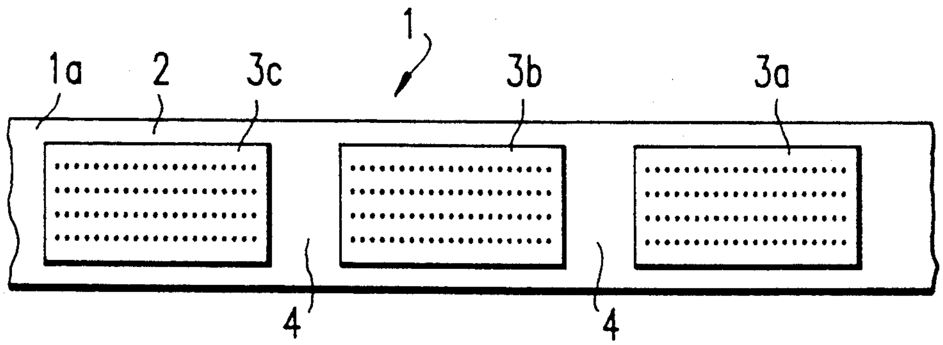
FIG. 3 is a plan view showing one example of conventional transfer paper.
Figure 4:
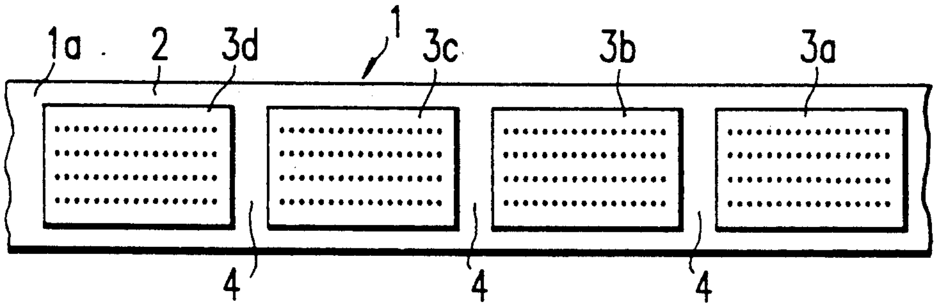
FIG. 4 is a plan view showing one example of a sheet of transfer paper used in the machine according to the present invention.

The pullback in these methods is achieved by provision of a force which urges the supplying roll axle 5 to rotate in the reverse direction. An example of a sheet of transfer paper used in a machine according to the present invention is shown in FIG. 4. This transfer paper 1 is similar to the transfer paper 1 used in the machine of the conventional art which is shown in FIG. 3. It is, however, characterized by the shortened width of the blank space 4.

The objects of transfer are not limited to a particular type but may include any type of object on which transfer can be affected with a heat roll. For example, cylindrical surfaces of plastic receptacles are suitable object for this process.

Figure 5A:
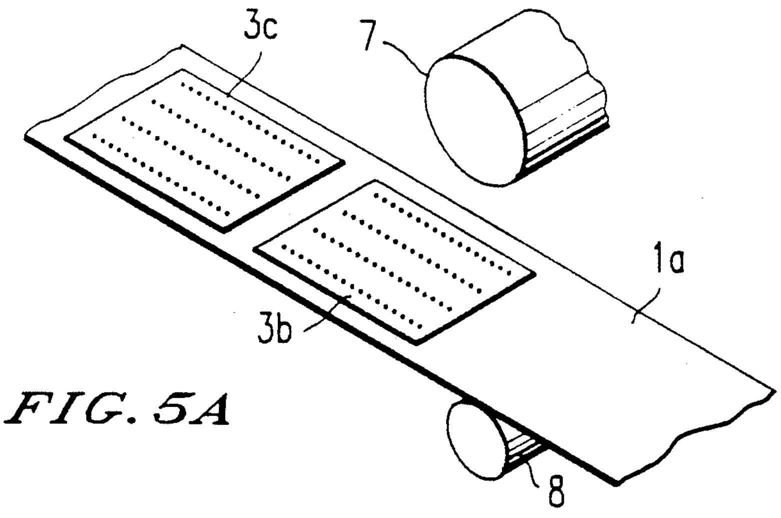
FIG. 5 is a perspective view showing the stages of the transfer process.
Figure 5B:
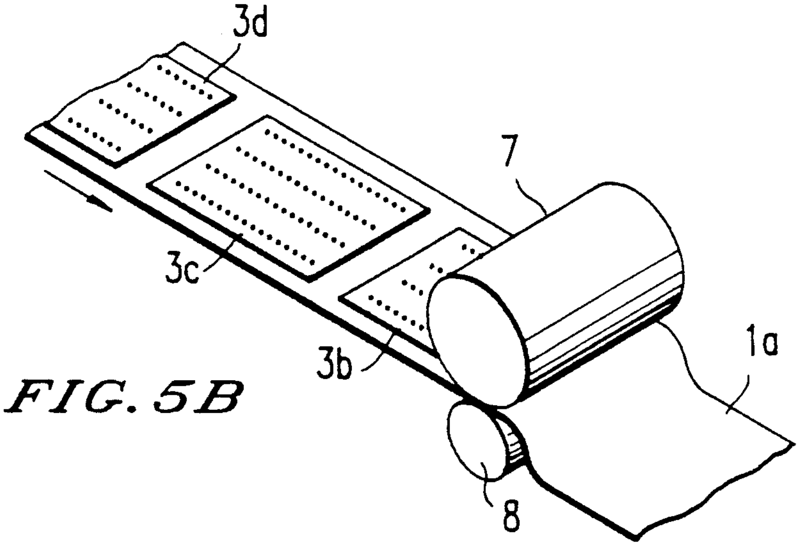
Figure 5C:
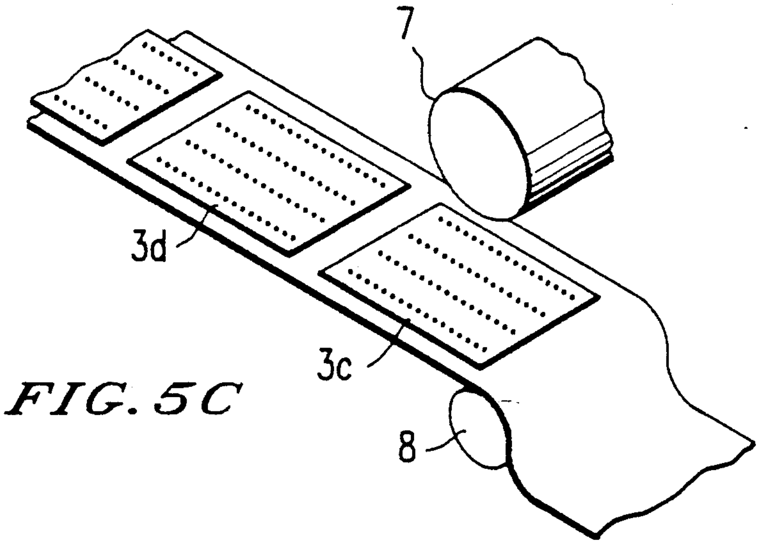

The operation of the machine of the present invention is similar to the conventional machine above described. This aspect of the invention will be described mainly referring to the pullback mechanism which is newly applied. FIG. 5 shows the movement of the transfer paper immediately below the heat roll. Part (1) of FIG. 5 shows the condition before the heat roll descends and starts the heat transfer operation. As shown in the figure, the printing ink surfaces on the right side of the figure have already been transferred, leaving the transfer paper 1*a* alone without ink on that part of its surface. The heat roll 7 descends and causes the transfer paper 1 to progress, at the same time performing the heat transfer operation. The condition wherein this transfer is effected is shown in part (2) of FIG. 5. The printing ink surface 3*b* printed on the lower side of the transfer paper 1 is transferred to the object of transfer 8, and the transfer paper 1 progreses toward the right side of the figure, being fed by the heat roll 7. The transfer paper 1*a* having undergone the transfer operation is then suspended (i.e., hanging without being under tension). Part (3) of FIG. 5 shows the condition in which the transfer operation has been completed. The heat roll 7 has already moved uwpards, and the takeup roll has started rotating, but the suspension of the transfer paper 1*a* is still maintained. As this state progresses further, the takeup roll axle is stopped by the command of the sensor when the amount of rotation of this axle corresponds to one pitch, so the supplying roll pulls back and rewinds the suspended portion of the transfer paper, which is, accordingly, returned to the condition shown in part (1) of FIG. 5. In this case, it should of course be noted that reference numeral 3*b* designating a printing ink surface is replaced by 3*c* in part (1) of FIG. 5. In a machine using the movable bar, a like movement is performed.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

Machine Embodiment 1

Figure 6:
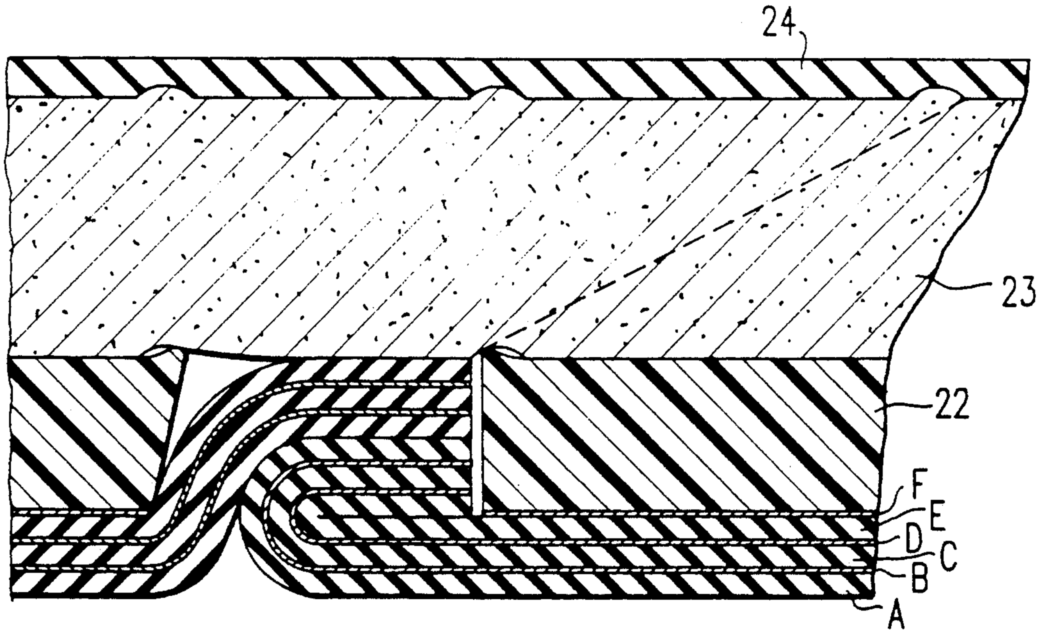
FIG. 6 is a cross-sectional view of one example of the object of transfer applied to the transfer according to the present invention.

A front view of a machine embodying the present invention is shown in FIG. 1. This machine is similar to the conventional machine except that the position of the sensor 13 is shifted from point A to point B. Consequently, the stopping position of the takeup roll 6 is moved closer to the supplying roll, corresponding to this shift, and the surplus portion which is suspended is pulled back and rewound by the supplying roll, so that the next transfer is started from this position. The transfer has been performed by using this machine, applying, as an object of transfer, a laminated pipe for a can barrel which is, as shown in FIG. 6, composed of the following layers: an innermost layer A of unstretched polypropylene, 70 μm thick; a next layer B of carboxylic acid grafted polypropylene, 7 μm thick; a layer C of aluminum, 9 μm thick; a layer D of polyurethane adhesive, 4.5 $g/m^2$; a layer E of unstretched polypropylene, 30 μm thick; a layer F of polyurethane adhesive 4.5$g/m^2$; an adhered sheet 22 made of unstretched polypropylene, 200 μm thick; a base plastic layer 23 made of knead mixture of polypropylene and calcium carbonate with an even intermixing ratio, approx. 600 μm thick; and an outermost coated layer 24 of polypropylene block copolymer, 10–20 μm thick. This results in a satisfactory condition of the transfer, a good finish of the printed surface, and a reduced dimension of the blank space on the transfer layout sheet, which is one half of the dimension necessary for conventional machines.

Machine Embodiment 2

Figure 2:
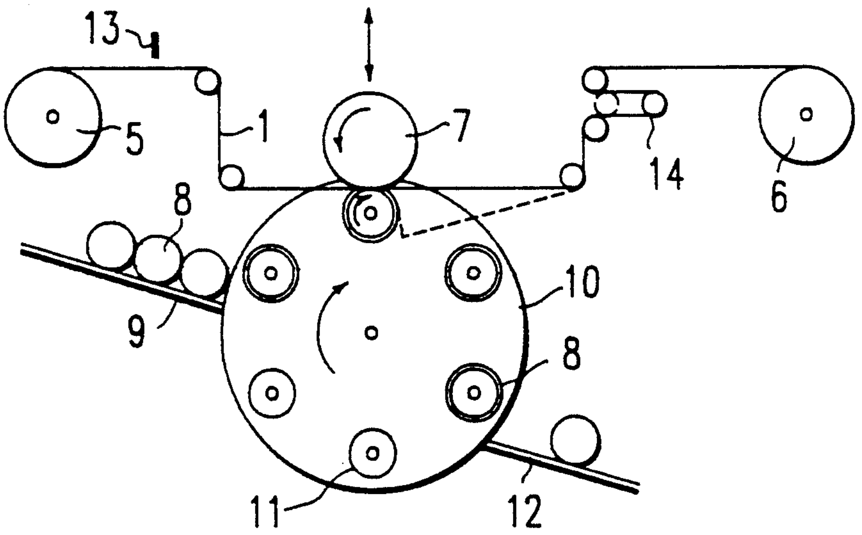
FIG. 2 is a front view of another embodiment of the invention.

A front view of a machine as the embodiment using a movable bar is shown in FIG. 2. The movable bar 14 is provided on the moving path of the transfer paper 1*a* which has undergone the transfer process, and is constructed such that it can tension and loosen, in its reciprocating movement, the transfer paper 1*a* suspended on this movable bar.

Figure 7:
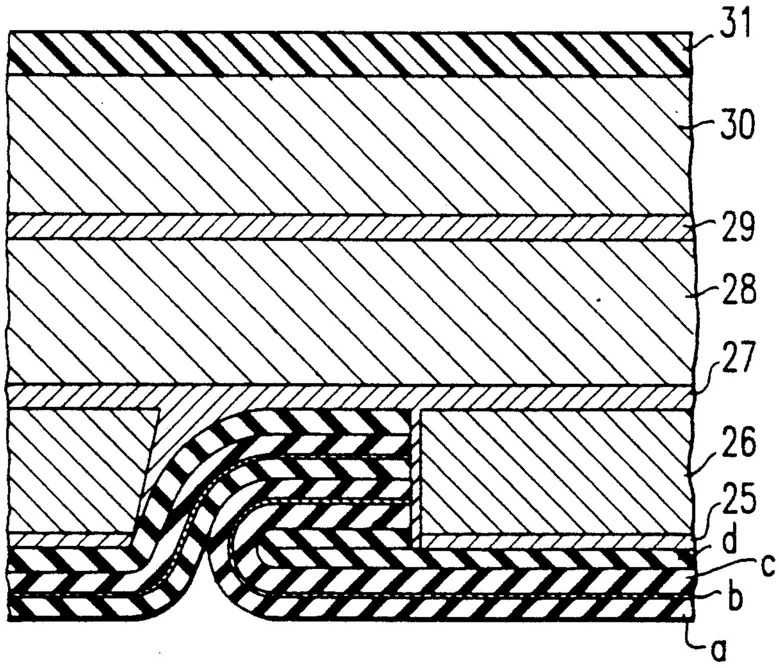
FIG. 7 is a cross-sectional view of another object of transfer applied to the same.

The movable bar 14 is placed initially in a position indicated by the solid line of FIG. 2 and moves to a position of the dotted line after the sensor 13 has stopped the rotation of the takeup roll axle 6 and ceased its work, before the heat roll 7 descends. The suspended portion of the transfer paper whereby caused is pulled back and rewound by the supplying roll, followed by the descent of the heat roll 7 and the heat transfer process. The movable bar returns to the position of the solid line when one fed portion of the transfer paper 1*a* is about to recover. Transfer using this machine has been performed to a laminated pipe for a can barrel, which is, as shown in FIG. 7, composed of an innermost layer (a) of low density polyethylene, 60 μm thick; a layer (b) of aliphatic polyurethane adhesive, 4.5 g/m; a layer (c) of aluminum foil, 9 μm thick; a layer (d) of low density polyethylene, 25μ thick; a layer 25 of polyvinyl acetate adhesive, a sheet layer of paper 26, 0.2 mm thick; a layer 27 of polyvinyl acetate adhesive; a medium layer of paper 28, 0.3 mm thick, helically wound with its side ends opposed each other; a layer 29 of polypropylene for adhesion, MI=50 to 100; an upper layer of paper 30, 0.3 mm thick, helically wound, being shifted from opposed portions of the medium layer 28; and a layer 31 of polyethylene, MI=50–100, 10 to 20 μm; thick. This has resulted in a satisfactory condition of the transfer, a good finish of the printed surface, and a reduced dimension of the blank space of the transfer layout sheet, which is one fourth of the dimension necessary for conventional machines.

According to the present invention as described above, when each heat transfer operation is completed, the blank space alone is located immediately below the heat roll so that the heat of the heat roll does not affect the printing ink surfaces. Accordingly, it is possible for the dimension of the blank space to be reduced to approximately one half or a quarter of the dimension necessary for the conventional art. Thus, the number of the transfer cycles in a unitary length of the transfer paper can be increased, while the unit cost of the transfer can be reduced.

Various other objects, features and attendant advantages of the present invention will be more fully appreciated as the same becomes better understood from the following examples which are not intended to be limiting of the invention unless so specified.

EXAMPLE 1

On a laminate tube for a can barrel, consisting sequentially in the outward direction as illustrated in FIG. 6 of an unstretched polypropylene layer A 70 μm in thickness, a carboxylic acid-grafted polypropylene adhesive layer B 7 μm in thickness, an aluminum foil layer C 9 μm in thickness, a urethane type adhesive layer D applied at a rate of 4.5 $g/m^2$, an unstretched polypropylene layer E 30 μm in thickness, a urethane type adhesive layer F applied at a rate of 4.5 $g/m^2$, a superposed sheet 22 of unstretched polypropylene 200 μm in thickness, a coating plastic layer 23 of a 1:1 mixture of polypropylene and calcium carbonate about 600 μm in thickness, a coating layer 24 of polypropylene block copolymer 10 to 20 μm in thickness, transfer printing was carried out with a transfer printing apparatus under the following conditions.

Base sheet for transfer sheet: Biaxially stretched polyester film 12 μm in thickness Temperature of hot roll: 220° C.

Temperature for preheating substrate: 90° C.

Figure 9:
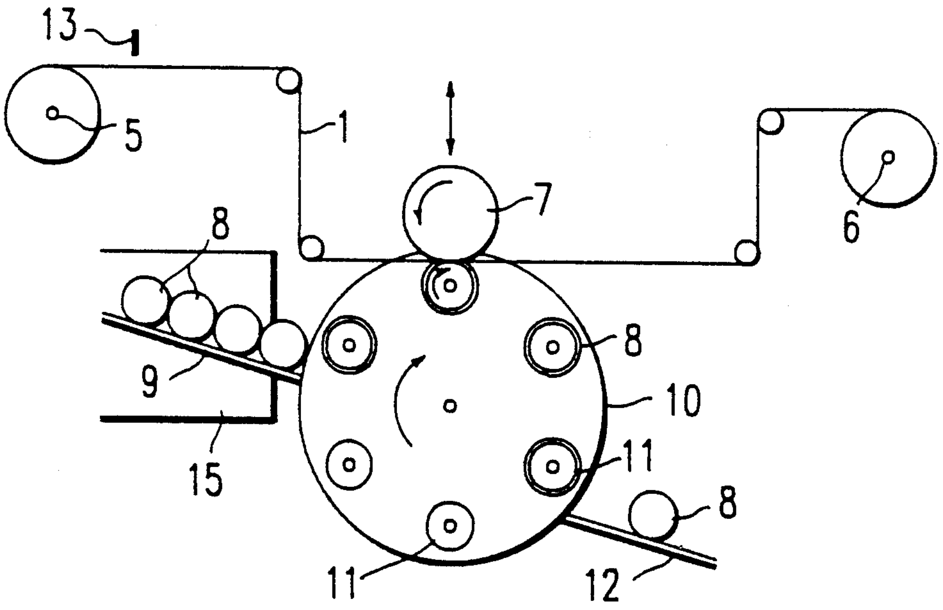
FIG. 9 is a front view schematically illustrating a transfer apparatus that can be used in the practice of the method of the present invention.
Figure 10:
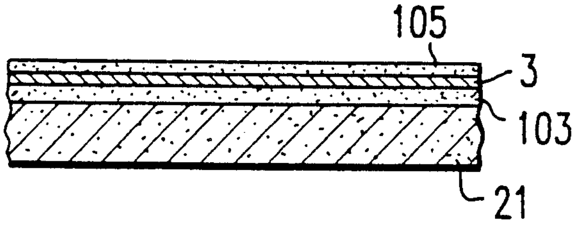
FIG. 10 is a cross-sectional view of a typical transfer sheet used in conventional methods.

The transfer printing apparatus used in this printing operation is illustrated in FIG. 9 and comprises a feed roll shaft 5 for transfer sheet 1, a hot roll 7, a takeup roll shaft 6, a sensor 13 for issuing commands to start and stop the takeup roll shaft 6, and a mechanism for feeding a laminate tube 8. The transfer sheet 1 is fed out of the feed roll shaft 5, passes under the heat roll 7, and is wound up on the takeup roll shaft 6. The feed roll shaft 5 is constantly urged in the direction opposite the direction of feeding of the transfer sheet 1 so as to preclude the transfer sheet from the otherwise possible loosening of the transfer sheet. In the meantime, the takeup roll shaft 6 is intermittently driven by the commands from the sensor 13. The heat roll 7 is continuously rotated and, at the same time, intermittently moved vertically and, at the lower reach of the vertical motion thereof, pressed into contact with the laminate tube 8 through the medium of the transfer sheet 1 so as to impart rotation to the laminate tube 8 and effect transfer printing. The mechanism for feeding the laminate tube 8 comprises a feed path 9, a box-shaped hot-air heater 15, a rotary plate 10 having a plurality of mandrels 11 rotatably attached thereto, and a discharge path 12.

Before the transfer printing is started, this apparatus is in such a state that the hot roll 7 is at the upper reach of the vertical motion thereof and the transfer sheet 1 is at a stop where the center of a margin 4 between adjacent printing ink faces 3 (FIG. 3) falls directly below the hot roll 7. A multiplicity of laminate tubes 8 are continuously fed through the feed path 9, loosely nipped by the mandrels 11, and advanced by the rotation of the rotary plate 10 to a point directly below the hot roll 7. Then, the hot roll 7 is lowered and pressed into contact with the laminate tube 10 and caused to impart rotation to the laminate tube and effect transfer printing thereon. When the transfer printing is completed, the hot roll 7 is elevated and the sensor 13 is actuated to rotate the takeup roll shaft 6 by an angle equivalent to one pitch of the transfer sheet 1. In the meantime, the next laminate tube is advanced by the rotation of the rotary plate 10 to the point directly below the hot roll, with the result that the apparatus is readied for the next round of transfer printing. The laminate tube 8 which has undergone the transfer printing and has been brought to the discharge path 12 is released via the discharge path 12 and transferred to the next step.

Figure 8:
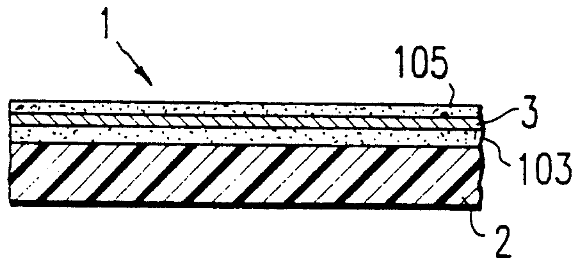
FIG. 8 is a cross-sectional view of a typical substrate used for the transfer printing by the method of this invention.

The transfer sheet 1 used in this working example had a construction whose cross section is shown in FIG. 8 and whose top view is shown in FIG. 3 or 4. This transfer sheet 1 comprised a base sheet 2 of biaxially stretched polypropylene film 20 μm in thickness, a peel layer 103, a printing ink layer 3, and an adhesive layer 105. The printing ink layer 3 consists of a plurality of strips regularly spaced by a margin 4 as illustrated in FIG. 3 or 4.

When the transfer printing described above was made on the outer surface of the laminate tube for use on a can barrel, the transfer of print occurred satisfactorily and the printed surface was clean. The speed of printing in this operation was six times as high as that by the convention method.

EXAMPLE 2

On a laminate tube for a can barrel, consisting sequentially in the outward direction as illustrated in FIG. 7 of low-density polyethylene layer (a) 60 μm in thickness, an aliphatic urethane type adhesive layer (b) applied at a rate of 4.5 g/m$^2$, an aluminum foil (c) 9 μm in thickness, a low-density polyethylene layer (d) 25 μm in thickness, a vinyl acetate type adhesive layer 25, a sheet layer 26 of paper 0.2 mm in thickness, a vinyl acetate type adhesive layer 27, an intermedite paper layer 28 0.3 mm in thickness having the lateral edges spirally coiled in an abutted state, a polypropylene layer 29 of MI=50 to 100 intended to aid in adhesion, an upper paper layer 30 0.3 mm in thickness having abutted portions spirally coiled as staggered from the abutted portions of the aforementioned intermediate paper layer 28, and a polyethylene layer 31 of MI=50 to 100 having a thickness of 10 to 20 μm, transfer printing was effected with a transfer printing apparatus schematically illustrated in FIG. 9 under the following conditions.

Base sheet for transfer sheet: Biaxially stretched polypropylene film 20 μm in thickness.

Temperature of hot roll: 200° C.

Temperature of preheating of substrate: 80° C.

When the transfer printing was made as described above on the outer surface of the laminate tube for a can barrel, the transfer of print occurred satisfactorily and the printed surface was clean. The speed of printing in this operation was ten times as high as that of the conventional method.

As shown by these examples, when the method of the present invention is used, the printing cost can be lowered by using the base sheet of inexpensive biaxially stretched plastic film in the transfer sheet and the speed of printing can be increased to 5 to 10 times as high as that of the conventional method by having the substrate for printing heated in advance.

The invention now being fully described, it will be readily apparent to one of ordinary skill in the art that many changes and modifications can be made thereto without departing from the spirit or scope of the invention as set forth and claimed herein.

What is claimed as new and desired to be secured by Letters Patent of the United States is:

1. A method for thermal transfer printing, which consists essentially of:

(a) heating, with a hot roll, a transfer sheet, comprising a printing ink layer having an inner and outer side formed on a base sheet with a peel layer therebetween, and with an adhesive layer on said outer side of the printing ink layer, wherein said base sheet is a biaxially stretched plastic film, and (b) concurrently pressing, with the hot roll, said transfer sheet against a substrate for printing, with a pressure sufficient to thereby transfer said printing ink layer to said substrate, wherein said substrate for printing is preheated prior to said pressing, and wherein a surface of said substrate is preheated at a temperature of from about 90° C. to 130° C., and wherein said hot roll is maintained at a temperature of not more than 240° C., and further wherein said peel layer is made of chloride rubber.

2. The method of claim 1, wherein said biaxially stretched plastic film is a polyester or polypropylene film.

3. The method of claim 1, wherein said film has a thickness of from 10 to 50 mm.

4. The method of claim 1, wherein said substrate is polypropylene or polyethylene.

5. The method of claim 1, wherein said substrate for printing is a container having a layer of polyethylene, polypropylene, polyethylene terephthalate, vinyl chloride, polycarbonate and acryl resin on the outermost surfaces thereof; a plastic handle or a metal can.

* * * * *